United States Patent [19]

Mena

[11] 4,073,521
[45] Feb. 14, 1978

[54] CLOSURE LOCK WITH INFLATABLE BLADDER

[76] Inventor: Joseph M. Mena, 1961 Greenfield Drive, West Covina, Calif. 91792

[21] Appl. No.: 718,591

[22] Filed: Aug. 30, 1976

[51] Int. Cl.² ............................................. E05C 21/02
[52] U.S. Cl. .................................. 292/256.65; 292/1; 49/477
[58] Field of Search ............... 49/477; 292/256, 256.6, 292/256.61, 256.65, 1

[56] References Cited

U.S. PATENT DOCUMENTS 3,449,864  6/1969  Prost-Dame et al. ................. 49/477

FOREIGN PATENT DOCUMENTS 1,093,257  11/1954  France ............................. 292/256.65

Primary Examiner—Richard E. Moore
Attorney, Agent, or Firm—William P. Green

[57] ABSTRACT

A closure which is releasably retained in closed position relative to a surrounding structure by inflation of a locking bladder, which preferably extends about the periphery of the closure and is partially received in opposed grooves in the closure and the surrounding structure respectively.

16 Claims, 4 Drawing Figures

CLOSURE LOCK WITH INFLATABLE BLADDER

BACKGROUND OF THE INVENTION

This invention relates to improved locking arrangements for releasably retaining a closure, such as for example an escape hatch, in a closed position.

There are numerous different types of installations in which it may be desirable to provide a closure structure which normally extends across and closes an opening in a wall or the like, but which under some circumstances must be easily and quickly releasable to an open condition enabling passage of a person or equipment through the opening. For example, in recreation vehicles, mobile homes, aircraft or boats, it is customary to provide one or more escape hatches which can be rapidly opened in the event of fire, accident, or other emergency to enable an escape from the vehicle or craft. Conventionally, such escape hatches may be retained in closed position by a manually operable latching or locking mechanism, whose actuation or release may be sufficiently difficult or inconvenient to effectively prevent opening of the closure under emergency conditions rapidly enough to save the occupants of the vehicle, craft, or the like.

SUMMARY OF THE INVENTION

The present invention provides an improved locking arrangement for retaining a hatch or other closure element in closed position very positively, but in a manner enabling extremely rapid and easily controlled release of the closure from a surrounding structure when desired. Preferably, the locking unit when released frees the closure for complete detachment from the surrounding structure to thus leave the opening completely unobstructed.

These results are achieved by provision of a unique lock employing an inflatable bladder element which acts upon inflation and deflation to lock the closure member in place and release it for opening movement. The locking means include a shoulder or shoulders carried by the closure and/or the surrounding structure, preferably both, and positioned to be in locking relation with respect to the bladder when inflated, to thereby prevent opening movement of the closure until deflation of the bladder. Desirably, the bladder projects into a groove in one or both of the coacting structures, preferably both, to thus interfit with the structures to attain the discussed locking action.

In the presently preferred form of the invention, the bladder takes the form of an endless inflatable tubular element, which is partially received within radially opposed grooves in the periphery of the closure member and in the inner edge of the surrounding structure to simultaneously interfit with both of the structures in a manner locking the closure in its closed condition. Appropriate means are provided for inflating and deflating the bladder, desirably in conjunction with a gauge for indicating the pressure in the bladder at any particular time.

BRIEF DESCRIPTION OF THE DRAWING

The above and other features and objects of the invention will be better understood from the following detailed description of the typical embodiments illustrated in the accompanying drawing in which.

DESCRIPTION OF THE PREFERRED EMBODIMENTS

Figure 1:
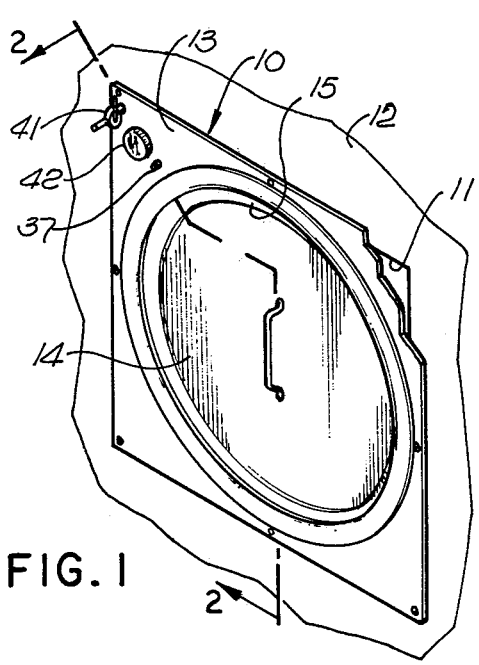
FIG. 1 is a perspective view of an escape hatch constructed in accordance with the invention.

Referring first to FIG. 1, there is illustrated at 10 an assembly which is constructed in accordance with the present invention and is connected into a rectangular or square opening 11 in a wall 12, which may typically be a wall, ceilling, or floor or a recreational vehicle, aircraft, boat, home, or any other structure in which it is desired to provide a rapidly openable closure. The assembly 10 includes a frame 13 connected into the opening 11, and a circular escape hatch 14 which is connected into a circular opening 15 in frame 13 and is releasably retained therein by an annular inflatable bladder 16 (FIG. 2).

The frame 13 as illustrated is externally square and internally circular to receive escape hatch 14. As best seen in FIG. 2, this frame may be formed of two parts 17 and 18 which are connectable to wall 12 from its inner and outer sides respectively, the inner side being the left side as illustrated in FIG. 2. Part 17 has a planer portion 19 received at the inner side of wall 12 and secured at its periphery to the wall by screws 20. A flange 21 of part 17 may project perpendicular to its portion 19 along the boundary of opening 11 and wall 12. The second element 18 of frame 13 also has an externally square planar portion 23 extending parallel to portion 19 of part 17, and secured at its periphery to wall 12 by screws 24. At its inner edge, portion 23 of part 18 rigidly carries an annular portion 25, shaped to define an annular groove 26 facing radially inwardly toward and centered about axis 27 of the escape hatch.

Figure 2:
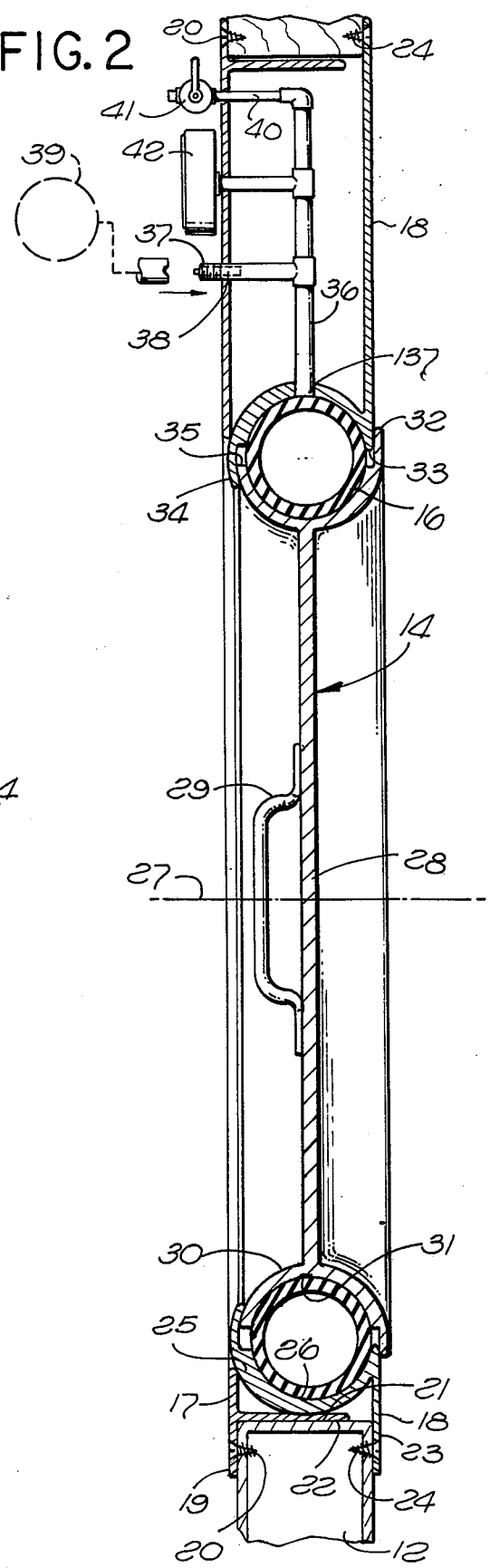
FIG. 2 is an enlarged section taken on line 2—2 of FIG. 1.

The hatch proper 14 may take the form of a flat plate 28 lying in a plane perpendicular to axis 27 and having a handle 29 at its inner side by which the hatch may be pulled to its FIG. 2 closed position. At its periphery, the plate portion 28 of hatch 14 rigidly carries and may be integral with an annular rim 30, which contains and defines an annular groove 31 facing radially outwardly with respect to axis 27 and toward groove 26 in part 18. In the FIG. 2 closed position of the hatch, these two radially opposed grooves 26 and 31 are complementary, to define together a toroidal space centered about axis 27 and receiving the annular inflatable bladder 16. Access to the space from either side of the hatch is prevented by overlapping edges on the parts 18 and 30. More particularly, at the outer side of the hatch (right side in FIG. 2), it is noted that the annular edge portion 32 of hatch 14 projects outwardly beyond, and overlaps, the inner edge 33 of part 18 of the frame, while at the inner side of the hatch, the annular edge portion 34 of part 18 projects radially inwardly beyond, and overlaps, the annular edge 35 of the hatch. It is also noted that the edge portion 32 of part 14 projects radially outwardly beyond its edge 35, and the edge portion 34 of the frame projects radially inwardly beyond its other edge 33.

The bladder 16 may be formed of rubber or other flexible preferably elastic inflatable material, such as for example that utilized in automobile inner tubes, and is circularly continuous or endless about axis 27. A filling tube 36 is connected to bladder 16 and extends outwardly therefrom through an opening 137 in part 18 of the frame, and into the interior of the frame between its two parts 17 and 18, desirably at a corner location as illustrated in FIG. 1. This tube 36 may be connected to a filling connection 37 containing a conventional check valve filling core 38 adapted to permit compressed air or pressurized fluid to be filled into the bladder from a pump or other source diagrammatically represented at 39, but preventing reverse flow. Air or other pressurized fluid may be discharged rapidly from the bladder through a line 40, by opening of a manually actuated valve 41. A gauge 42 is also connected to line 36 from the bladder, and indicates the pressure of the air in the bladder.

Figure 3:
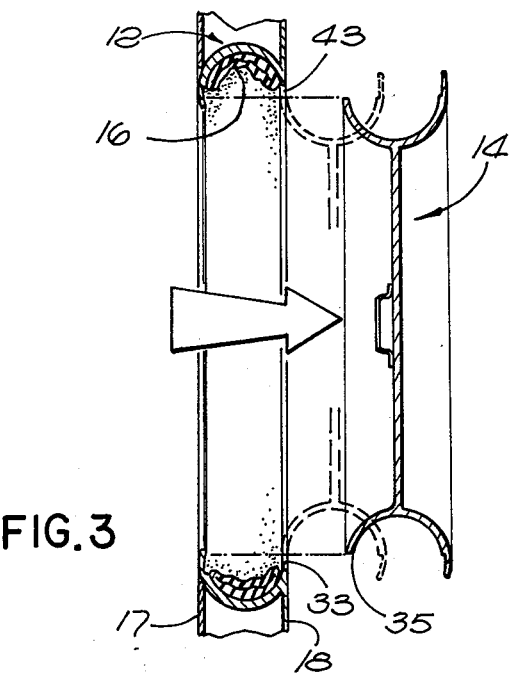
FIG. 3 is a reduced scale view similar to FIG. 2, but showing the escape hatch in released condition and as it is moving to open position.

To now describe a cycle of use of the device of FIGS. 1 to 3, assume that initially the bladder 16 is deflated, and that escape hatch 14 has been moved axially into the circular opening within frame 13, and to the position of FIG. 2. In thus closing the hatch, it is moved leftwardly in FIG. 2 by grasping handle 29 of the hatch and pulling it to a position within the frame. After the hatch is appropriately located within the frame, a line from a compressed air source is moved into engagement with filling fitting 37, to fill compressed air into the bladder 16, up to a predetermined pressure condition as indicated on gauge 42. Such inflation of the bladder expands it to the condition illustrated in FIG. 2, in which the radially outer portion of the bladder is forced tightly against the inner surface 26 of the frame, and the radially inner portion of the bladder is forced tightly against surface 31 of the escape hatch, with this interfitting relationship between the bladder and the frame and hatch parts serving to interlock the parts in a manner positively preventing removal of the escape hatch from the frame. As will be understood, the walls of the annular grooves within which the bladder is received form shoulders extending generally transversely of axis 27 and received in blocking relation with respect to the bladder to prevent relative axial movement between the bladder and the frame and hatch parts. In the event of an emergency or other condition requiring opening of the hatch, a user opens valve 41 to release the compressed air or other fluid from bladder 16, and thereby deflate the bladder to the condition represented in FIG. 3, in which it no longer locks the hatch in position but permits its removal rightwardly to open position. As the hatch moves outwardly, it at one point reaches and moves through the position illustrated in broken lines in FIG. 3, in which position annular edge 35 of the hatch is radially opposite annular edge 33 of the frame. It is noted that in that position these two edges are spaced radially apart a substantial distance, to provide an annular gap 43 between the hatch and frame which is of sufficient radial width to avoid unwanted clamping or constriction of the deflated bladder between these edges. Thus, if upon deflation the bladder or a portion thereof were to tend to move outwardly (rightwardly in FIG. 3) with the hatch, it could not be trapped within gap 43 in a manner interfering with free opening movement of the hatch.

Figure 4:
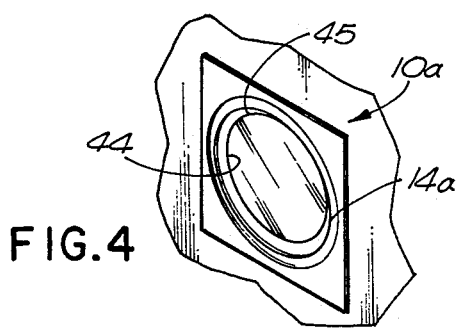
FIG. 4 is a view similar to FIG. 1, but showing a variational arrangement in which the closure member includes a window.

In the variational arrangement of FIG. 4, the assembly 10a may be considered as identical with assembly 10 of FIG. 1, except that the unit 14a corresponding to escape hatch 14 of the first form of the invention is not a solid hatch element, but rather contains an opening 44 within which a transparent window 45 is carried. In a similar fashion, the closure element may take any other desired form. It is also contemplated that the bladder and the engaging grooves may in some cases be of shapes other than circular about the main axis 27, and may have various configurations for satisfying particular requirements of specific installation environments.

While certain specific embodiments of the present invention have been disclosed as typical, the invention is of course not limited to these particular forms, but rather is applicable broadly to all such variations as fall within the scope of the appended claims.

I claim:

1. The combination comprising:
    a frame structure containing an opening;
    a closure structure movable relative to said frame structure between a closed position of extension across said opening and an open position;
    an inflatable bladder operable by inflation to lock said closure structure against opening movement and by deflation to permit such opening movement;
    said bladder being carried by one of said structures and being engageable when inflated with a shoulder on the other structure in a relation blocking opening movement of the closure structure; and
    control means operable from a first side of said frame and closure structures to apply pressure fluid to the bladder and thereby lock the closure against opening movement, and to release pressure fluid from the bladder and permit opening of the closure;
    said structures being constructed to block off all access to the bladder from a second side of said structures by puncturing instruments, and thereby positively prevent unauthorized opening of said closure structure from said second side.

2. The combination as recited in claim 1, including means forming a recess into which said bladder is forced by inflation to an interfitting position blocking said opening movement of the closure structure.

3. The combination as recited in claim 1, in which said control means include a fluid pressure inlet fitting carried by said frame structure and accessible from said first side of the structure to fill pressure fluid into the bladder, and valve means carried by the frame structure and accessible from said first side thereof to release pressure fluid from the bladder.

4. The combination as recited in claim 1, including means forming two recesses in said frame structure and said closure structure respectively and which receive different portions of said bladder when the latter is inflated, in a relation blocking opening movement of the closure structure.

5. The combination as recited in claim 1, in which said control means include a fill connection accessible from said first side of said structures and through which pressure fluid is injectable into said bladder to actuate it to locking condition.

6. The combination as recited in claim 1, including a gauge for indicating the pressure of inflating fluid within said bladder.

7. The combination as recited in claim 1, in which one of said structures has an edge portion at said second side of the structures extending into overlapping relation with respect to an adjacent portion of the other structure at a location opposite said bladder and preventing access of puncturing instruments thereto from said second side.

8. The combination as recited in claim 1, in which said structures are constructed to positively block access of puncturing instruments to said bladder from either side of said structures.

9. The combination comprising:
a frame structure containing an opening:
a closure structure movable between a closed position of extension across said opening and an opened position;
a locking rim carried by said closure structure and defining a groove extending along the periphery of the closure structure and facing outwardly toward said frame structure;
an element carried by said frame structure about said opening and forming a second groove extending about the closure structure and facing inwardly toward said first groove;
an endless flexible inflatable bladder extending about said closure structure and adapted when inflated to be received partially within each of said grooves to releasably lock the closure structure against opening movement, said closure structure being released for opening movement by deflation of the bladder; and
control means operable from a first side of said structures to apply locking pressure to and release it from said bladder;
said structures being constructed to block off all access to the bladder from a second side of the structures by puncturing instruments and thereby positively prevent unauthorized opening of said closure structure from said second side.

10. The combination as recited in claim 9, in which said rim has a first edge at one side of said first groove which overlaps a first edge of said element, and has a second edge at the other side of said first groove and which is overlapped by a corresponding second edge of said element, said first edge of said rim projecting outwardly farther than said second edge thereof, said second edge of said element projecting inwardly farther than said first edge thereof.

11. The combination as recited in claim 9, in which said control means include a connection for filling pressurized fluid into said bladder from said first side of the structures, means for releasing fluid from the bladder from said first side of said structures, and gauge means at said first side for indicating the pressure of fluid in the bladder.

12. The combination comprising:
a frame structure containing an opening;
a closure structure movable relative to said frame structure between a closed position of extension across said opening and an open position;
an inflatable bladder operable by inflation to lock said closure structure against opening movement and by deflation to permit such opening movement; and
control means operable from a first side of said frame and closure structures to apply pressure fluid to the bladder and thereby lock the closure against opening movement, and to release pressure fluid from the bladder and permit opening and the closure;
said structures being constructed to block off all access to the bladder from a second side of said structures by puncturing instruments, and thereby positively prevent unauthorized opening of said closure structure from said second side;
said bladder being an inflatable endless element extending about the periphery of said closure structure;
there being a shoulder formed on the periphery of said closure structure at a location opposite said endless bladder when inflated to block opening movement of the closure structure.

13. The combination comprising:
a frame structure containing an opening;
a closure structure movable relative to said frame structure between a closed position of extension across said opening and an open position;
an inflatable bladder operable by inflation to lock said closure structure against opening movement and by deflation to permit such opening movement; and
control means operable from a first side of said frame and closure structures to apply pressure fluid to the bladder and thereby lock the closure against opening movement, and to release pressure fluid from the bladder and permit opening of the closure;
said structures being constructed to block off all access to the bladder from a second side of said structures by puncturing instruments, and thereby positively prevent unauthorized opening of said closure structure from said second side;
said bladder being an inflatable endless tubular element extending about the periphery of said closure structures;
there being means carried by said closure structure and forming a groove extending along the periphery thereof and facing outwardly toward said frame structure and into which said endless bladder is forced by inflation to block opening movement of the closure structure.

14. The combination as recited in claim 13, including means carried by said frame structure and forming a groove facing inwardly toward and opposite said first mentioned groove and partially receiving said endless bladder when inflated.

15. The combination comprising:
a frame structure containing an opening;
a closure structure movable relative to said frame structure between a closed position of extension across said opening and an open position;
an inflatable bladder operable by inflation to lock said closure structure against opening movement and by deflation to permit such opening movement;
control means operable from a first side of said frame and closure structures to apply pressure fluid to the bladder and thereby lock the closure against opening movement, and to release pressure fluid from the bladder and permit opening of the closure;
said structures being constructed to block off all access to the bladder from a second side of said structures by puncturing instruments, and thereby positively prevent unauthorized opening of said closure structure from said second side; and
means carried by said two structures respectively and forming two opposed grooves each partially receiving said bladder when inflated to lock the closure structure against opening movement,
said closure structure having a first peripheral edge at one side of the bladder overlapping a first edge of said frame structure to prevent access of puncturing instruments thereto, and having a second peripheral edge at the other side of said bladder and which is overlapped by a second edge of said frame structure to prevent access of puncturing instruments from said other side of the bladder.

16. The combination comprising:

a frame structure containing an opening;

a closure structure movable relative to said frame structure between a closed position of extension across said opening and an open position;

an inflatable bladder operable by inflation to lock said closure structure against opening movement and by deflation to permit such opening movement;

control means operable from a first side of said frame and closure structures to apply pressure fluid to the bladder and thereby lock the closure against opening movement, and to release pressure fluid from the bladder and permit opening of the closure;

said structures being constructed to block off all access to the bladder from a second side of said structures by puncturing instruments, and thereby positively prevent unauthorized opening of said closure structure from said second side; and means carried by said two structures respectively and forming two opposed grooves each partially receiving said bladder when inflated to lock the closure structure against opening movement, said closure structure having a first peripheral edge at one side of the bladder overlapping a first edge of said frame structure, and having a second peripheral edge at the other side of said bladder and which is overlapped radially by a second edge of said frame structure, said first edge of said closure structure projecting outwardly farther than said second edge thereof, and said second edge of said frame structure projecting inwardly farther than said first edge thereof, so that upon opening movement of said closure structure said second edge thereof is spaced from said first edge of said frame structure, in moving therepast, to prevent clamping of the bladder therebetween.

* * * * *